UNITED STATES PATENT OFFICE.

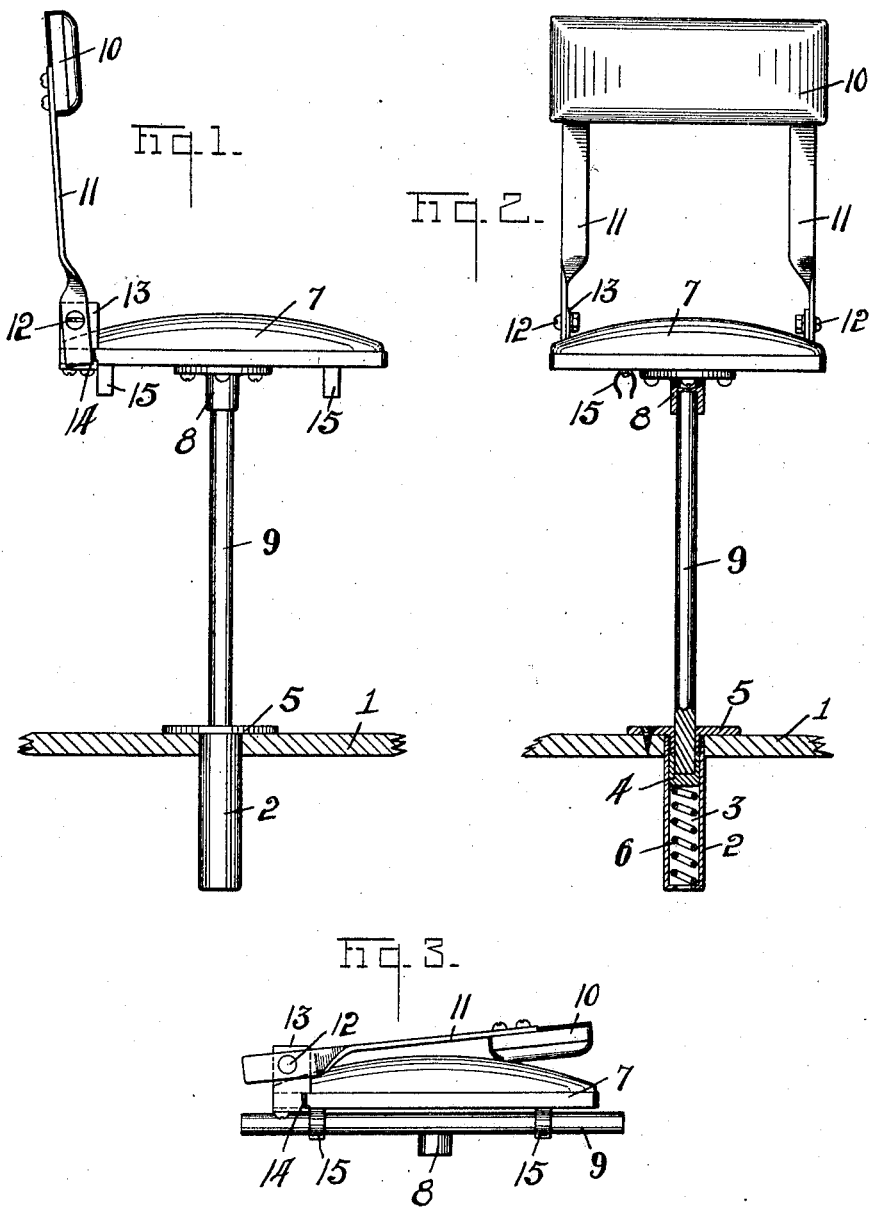

FREDERICK H. BUSKE, OF TOLEDO, OHIO.

JUMPER-SEAT.

1,397,675.  Specification of Letters Patent.  Patented Nov. 22, 1921.

Application filed May 21, 1921. Serial No. 471,396.

*To all whom it may concern:*

Be it known that I, FREDERICK H. BUSKE, a citizen of the United States, and a resident of Toledo, in the county of Lucas and State of Ohio, have made an Invention Appertaining to Jumper-Seats; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to jumper seats of the type particularly intended for use in connection with automobiles.

The object of the invention is the provision of a simple, durable and inexpensive seat of the class described having a pedestal standard for detachable and preferably yielding engagement with a floor socket and adapted, when not in use, to be compactly folded for storage under a seat or in some other small storage space.

The invention is fully described in the following specification, and while in its broader aspect, it is capable of embodiment in numerous forms, a preferred embodiment thereof is illustrated in the accompanying drawings, in which, Figure 1 is a side elevation of a seat embodying the invention in set up position. Fig. 2 is a front elevation thereof in set up position with parts in section, and Fig. 3 is a side view of the seat in folded position for storage.

Referring to the drawings, 1 designates the floor of an automobile having a vertically disposed cylindrical or socketed member 2 carried thereby and extended downward therethrough and forming a guide socket 3 in which a plunger 4 is mounted for vertical reciprocatory movements. The cylinder 2 is suspended in the present instance through the floor from a ring flange 5 secured to the top of the floor and which has a nipple portion projecting downward therefrom and threaded into the upper end of the cylinder. A coiled compression spring 6 is mounted in the cylinder 2 between the lower partially closed end thereof and the plunger 4 to yieldingly retain the latter at the upper end of the cylinder in stop engagement with the shoulder formed in the cylinder by the flange nipple.

A seat 7 is provided centrally on its under side with a socket member 8 in which the upper end of a pedestal rod or standard 9 is removably fitted, whereby the seat is supported by the standard. The lower end of the standard is removably inserted into the cylinder 2 through the ring flange 5 and seats at its end in a socket provided therefor in a top of the plunger 4. It is thus evident that the pedestal 9 has a yielding or cushion support in the cylinder 2 and that the seat 7 when set up, is adapted to have free turning or pivotal movements either by reason of the socket member 8 turning on the upper end of the pedestal standard or by reason of the standard turning in the cylinder 2.

A foldable back 10 is provided for the seat 7 and, in the present instance, has spring arms 11 projecting downward therefrom and hingedly connected by pivots 12 to ears 13 rising from the rear edge portions of the seat at the respective sides thereof, thus enabling the back to be folded forward under the seat 7 in close relation thereto. The lower ends of the back arms 11 extend below their pivots and are adapted to coact with registering stop shoulders 14 on the side edges of the seat to limit the rearward swinging movements of the back.

When the seat is not in use the back 10 may be folded thereover and the pedestal 9 removed from the socket member 8 and from the floor socket 2 and secured to the under side of the seat parallel therewith by spring clips 15 attached to the seat bottom, as shown in Fig. 3. It is evident that the seat when thus folded forms a compact article which may be conveniently packed away under a seat of the automobile or in some other suitable space.

I wish it understood that my invention is not limited to any specific construction, arrangement or form of the parts, as it is capable of numerous modifications and changes without departing from the spirit of the claim.

Having thus described my invention, what I claim as new and desire to secure by Letters Patent, is,—

The combination with an automobile floor having an opening therein, of a cylinder projecting down through the floor opening and having an open top and a partially closed bottom, a ring flange carrying the cylinder at its upper end and secured to the top of the floor, a compression spring in the cylinder, a plunger in the cylinder resting on the spring, a pedestal standard removably mounted at its lower end in the cylinder in engagement with the plunger, a seat, a socket member centrally carried by the under side of the seat and removably and pivotally resting on the upper end of the standard, and a back hinged to the seat for folding thereover.

In testimony whereof I have hereunto signed my name to this specification.

FREDERICK H. BUSKE.